US012633521B2

(12) United States Patent
Xie et al.

(10) Patent No.: US 12,633,521 B2
(45) Date of Patent: *May 19, 2026

(54) SILICON NANOPARTICLES AND METHODS FOR PREPARING SILICON NANOPARTICLES

(71) Applicant: Aspen Aerogels, Inc., Northborough, MA (US)

(72) Inventors: Wei Xie, Everett, MA (US); Zhifei Li, Marlborough, MA (US); Roxana Trifu, Shrewsbury, MA (US); Harris Miller, Sharon, MA (US)

(73) Assignee: Aspen Aerogels, Inc., Northborough, MA (US)

( * ) Notice: Subject to any disclaimer, the term of this patent is extended or adjusted under 35 U.S.C. 154(b) by 52 days.

This patent is subject to a terminal disclaimer.

(21) Appl. No.: 18/625,474

(22) Filed: Apr. 3, 2024

(65) Prior Publication Data

US 2024/0274795 A1 Aug. 15, 2024

Related U.S. Application Data

(63) Continuation of application No. 17/409,077, filed on Aug. 23, 2021, now Pat. No. 11,978,890, which is a
(Continued)

(51) Int. Cl.
*H01M 4/36* (2006.01)
*C09C 1/28* (2006.01)
(Continued)

(52) U.S. Cl.
CPC .............. *H01M 4/364* (2013.01); *C09C 1/28* (2013.01); *C09C 3/12* (2013.01); *H01M 4/386* (2013.01);
(Continued)

(58) Field of Classification Search
CPC ...... H01M 4/364; H01M 4/386; H01M 4/587; H01M 2004/023; H01M 10/0525;
(Continued)

(56) References Cited

U.S. PATENT DOCUMENTS 5,795,559 A 8/1998 Pinnavaia et al.
2009/0047773 A1 2/2009 Mitchell et al.
(Continued)

FOREIGN PATENT DOCUMENTS

CN 106207142 A 12/2016
WO 2013029278 A1 3/2013
(Continued)

OTHER PUBLICATIONS

Aghajamali et al. "Size and Surface Effects of Silicon Nanocrystals in Graphene Aerogel Composite Anodes for Lithium Ion Batteries." Chem. Mater. 30.21(2018): 7782-7792.
(Continued)

*Primary Examiner* — Andrew J. Oyer
(74) *Attorney, Agent, or Firm* — WOMBLE BOND DICKINSON (US) LLP; Deborah M. Vernon; Scott R. Breining

(57) ABSTRACT

Silicon nanoparticles and methods for preparation of silicon nanoparticles are provided. Embodiments include a method for grinding silicon. Methods include providing silicon material, providing a grinding liquid including a polar solvent, and grinding the silicon material in the presence of the grinding liquid to yield silicon nanoparticles. Grinding the silicon in the presence of the grinding liquid can chemically functionalize the silicon material as the nanoparticles are formed to provide stable chemically functionalized nanoparticles.

22 Claims, 3 Drawing Sheets

AAI:M-6244 10.0kV 9.4mm x40.0k SE(M)          1.00um

Related U.S. Application Data continuation of application No. PCT/US2021/046870, filed on Aug. 20, 2021.

(60) Provisional application No. 63/068,502, filed on Aug. 21, 2020.

(51) Int. Cl.

| | |
|---|---|
| *C09C 3/12* | (2006.01) |
| *H01M 4/02* | (2006.01) |
| *H01M 4/38* | (2006.01) |
| *H01M 4/587* | (2010.01) |

(52) U.S. Cl.
CPC ......... *H01M 4/587* (2013.01); *C01P 2002/82* (2013.01); *C01P 2004/03* (2013.01); *C01P 2004/62* (2013.01); *C01P 2004/64* (2013.01); *C01P 2006/40* (2013.01); *H01M 2004/023* (2013.01)

(58) Field of Classification Search
CPC .... H01M 4/134; H01M 4/1395; H01M 4/366; H01M 4/62; H01M 4/625; C09C 1/28; C09C 3/12; C09C 1/30; C01P 2002/82; C01P 2004/03; C01P 2004/62; C01P 2004/64; C01P 2006/40; C08G 73/10; C01B 33/02; Y02E 60/10

See application file for complete search history.

(56) References Cited

U.S. PATENT DOCUMENTS

| | | | | |
|---|---|---|---|---|
| 2016/0164085 A1* | 6/2016 | Hanelt | .............. | H01M 10/0525 |
| | | | | 241/15 |
| 2019/0326589 A1* | 10/2019 | Ho | ...................... | H01M 4/1393 |
| 2020/0269207 A1 | 8/2020 | Zafiropoulos et al. | | |

FOREIGN PATENT DOCUMENTS

| | | |
|---|---|---|
| WO | 20180146768 A1 | 8/2018 |
| WO | 2018229515 A1 | 12/2018 |
| WO | 2020176756 A1 | 9/2020 |

OTHER PUBLICATIONS

International Search Report and Written Opinion issued in PCT Patent Application No. PCT/US2021/046870 dated Feb. 16, 2022.

* cited by examiner

AAI:M-6244 10.0kV 9.4mm x40.0k SE(M)     1.00um

SILICON NANOPARTICLES AND METHODS FOR PREPARING SILICON NANOPARTICLES

CROSS-REFERENCES TO RELATED APPLICATIONS

This application is a continuation of U.S. application Ser. No. 17/409,077, filed Aug. 23, 2021, which is a continuation of International Application No. PCT/US2021/46870 filed Aug. 20, 2021, entitled "Silicon Nanoparticles and Methods for Preparing Silicon Nanoparticles", which claims benefit of priority from U.S. Provisional Patent Application Ser. No. 63/068,502 filed Aug. 21, 2020, each of which are incorporated herein by reference in their entirety. This application also claims benefit of priority from U.S. Provisional Patent Application Ser. No. 63/068,502 filed Aug. 21, 2021.

FIELD

This invention relates, generally, to silicon nanoparticles and methods for preparation of silicon nanoparticles. More specifically, it relates to materials and methods for producing nanoscale silicon materials for use in electrochemical applications such as lithium-ion batteries.

BACKGROUND

Lithium-ion batteries (LIBs) have seen widespread use in a variety of applications, from handheld electronics to automobiles. They are a type of rechargeable battery in which lithium ions travel from an anode to a cathode during discharge and from the cathode to the anode during charge. Conventionally, the cathode is formed of lithium metal oxides (e.g., lithium cobalt oxide, lithium nickel dioxide, lithium manganese oxide), and the anode is formed of graphite, where lithium ions intercalate within graphite layers during charge (energy storage). Graphite is widely used because lithium intercalation is higher with graphite than other known carbons.

A major drawback of conventional LIBs is the limited capacity of graphite; in other words, graphite can accommodate only limited amounts of lithium. It is known that silicon has a greater affinity for lithium compared to graphite (carbon) and is capable of storing significantly higher amounts of lithium than graphite, theoretically resulting in higher capacity on the anode side of the LIB. By comparison, graphite has a theoretical capacity of 372 mAh/g in combination with lithium, whereas silicon has a theoretical capacity of 4200 mAh/g. Therefore, incorporating as much silicon as possible within the anode is desirable. Silicon, when fully lithiated, expands 3-4 times in volume. The expansion leads to high mechanical stressing on the silicon particles which can ultimately lead to fracturing. Fractured silicon particles can lead to a loss of electrical contact or isolation of the active material and in the electrode structure, producing an increase in resistivity, destruction of the electrode, and a loss of capacity. The decrease in capacity during charging and discharging cycles is referred to as fading or continuous capacity decrease and is generally irreversible. The use of nanometer-sized silicon particles can reduce mechanical stress and prevent the fracture of particles caused by lithiation. A decrease in particle size results in a corresponding increase in the ratio of surface area to volume. Smaller particles, e.g., nanoparticles, have a high surface area with low volume. Without being bound by theory, particle volume is the driving mechanism of expansive force. Thus, a reduction in volume results in a reduction in expansive force and a corresponding reduction in the probability and rate of particle fracture due to volume expansion during lithiation.

Nanosized silicon nanoparticles can be produced by grinding from larger silicon particles. Grinding can be performed using two main techniques: dry and wet. Dry grinding techniques involve adding powdered silicon materials to a vessel together with the grinding media, typically zirconium oxide (yttrium stabilized), aluminum oxide, silicon carbide, silicon oxide, quartz, or stainless steel. Dry grinding is known to be an inefficient and energy consuming process. The particle size distribution in a dry grinding process is controlled by matching the starting material particle size to the grinding media size. Wet grinding provides lower energy consumption for equivalent ground particle size, e.g., about 15-50% lower energy consumption. Wet grinding can also produce finer particles and result in less particle agglomeration. However, the liquid or liquid mixtures used for wet grinding can affect the chemical properties, surface properties and morphology, agglomeration, and downstream processing of the silicon particles. Furthermore, the chemical properties, surface properties and morphology of silicon particles can affect the agglomeration, processing, and electrochemical properties of the silicon particles.

Accordingly, improved methods for controlling, selecting, modifying, or improving the surface properties and morphology of electroactive materials, e.g., silicon, is needed. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein, especially in combination with the innovative aspects described herein.

The present invention may address one or more of the problems and deficiencies of the art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination or derivative thereof was at the priority date, publicly available, known to the public, part of common general knowledge, or otherwise constitutes prior art under the applicable statutory provisions; or is known to be relevant to an attempt to solve any problem with which this specification is concerned.

SUMMARY

The long-standing but heretofore unfulfilled need for an improved method of modifying or functionalizing the surface of electroactive materials, such as silicon, via various processes including grinding is now met by a new, useful, and nonobvious invention.

An aspect provides a silicon nanoparticle composition including silicon particles, wherein a surface of the silicon particles includes covalently bonded functional groups, and a porous three-dimensional network, wherein the silicon particles are dispersed throughout the porous three-dimensional network. For example, the surface of the silicon particles can include covalently bonded functional groups. For another example, the surface of the silicon particles can include hydrogen bonded functional groups. In some embodiments, the surface of the silicon particles before functionalization can include silane groups. For example, the silane groups can include silicon hydride. In some embodiments, the surface of the silicon particles before functionalization can include silicon oxide groups. In certain embodiments, the surface of the silicon particles before functionalization can include both silane groups (e.g., silicon hyride) and silicon oxide groups. In some examples, at least a portion of those silane and silicon oxide groups are present in combination with the bonded functional groups, e.g., silane groups and the bonded functional groups, silicon oxide groups and the bonded functional groups, or both silane and silicon oxide groups the bonded functional groups.

In an example, the porous three-dimensional network can be a sol-gel, an aerogel precursor, a polyimide precursor, an aerogel, a carbon aerogel, and/or a polyimide-derived carbon aerogel. The functional groups on the surface of the silicon particles can be bonded to carbon atoms within the porous three-dimensional network. For example, the functional groups on the surface of the silicon particles can be covalently bonded to carbon atoms within the porous three-dimensional network. For another example, the functional groups on the surface of the silicon particles can be hydrogen bonded to carbon atoms within the porous three-dimensional network.

In an example, the functional groups can include at least one of —OH, —COOH, —C—O—C—, —NH$_2$, —NHR, or combinations thereof. The bonded functional group can comprise isopropanol. The bonded functional groups can be selected from the group consisting of isopropanol, ethylene glycol methyl ether methacrylate, polyethylene glycol methyl ether methacrylate, unsaturated glycol, hydroxide groups, allylamine, vinyl benzyl amine hydrochloride, or aminoethyl methacrylate hydrochloride. In an example, the bonded functional groups comprise a hydroxyl, an unsaturated amine, an unsaturated glycol, or combinations thereof. In exemplary embodiments, the silicon particles can have a diameter of less than 150 nm.

An aspect provides a method for processing silicon. In exemplary embodiments, the method includes providing silicon material, providing a processing liquid, and processing the silicon material in the presence of the processing liquid to yield silicon nanoparticles. Before processing, the silicon material has a first particle size, e.g., a first particle size distribution. The first particle size can, in some embodiments, be the particle size or particle size distribution of individual particles of the silicon material. In other embodiments, the first particle size can be the particle size or particle size distribution of agglomerated particles of silicon. After processing, the silicon nanoparticles have a second particle size less than the first particle size, e.g., a second particle size distribution less than or lower than the first particle size distribution. In some embodiments, the second particle size can be the particle size or particle size distribution of de-agglomerated particles of silicon.

The processing liquid includes, in certain embodiments, a polar solvent. In some embodiments, the processing liquid is present at about 70 wt % to about 80 wt % of the total weight. The step of processing the silicon material in the presence of the processing liquid can functionalize a surface of the silicon material as the nanoparticles are formed to provide stable functionalized nanoparticles.

For example, the processing liquid can include a polar solvent selected from the group consisting of DMSO, DMF, NMP, DMAC, THF, 1,4-dioxane, diglyme, acetonitrile, isopropanol, and water. For example, the polar solvent can be water. In certain embodiments, the polar solvent can be a dipolar aprotic solvent. For example, the polar solvent can be DMAC. For another example, the polar solvent can be NMP. In certain embodiments, the processing liquid can further include a polyimide precursor monomer.

In exemplary embodiments of the methods for processing silicon disclosed herein, the first particle size is in the range of about 1 um to about 10 um. In certain embodiments, the second particle size is in the range of about 50 nm to about 500 nm.

In exemplary embodiments, the step of processing the silicon in the presence of the grinding liquid chemically functionalizes the silicon material as the nanoparticles are formed to provide stable chemically functionalized nanoparticles. For example, the processing liquid, or components thereof, can react with the silicon material. In other examples, the step of processing the silicon in the presence of the processing liquid functionalizes the silicon material as the nanoparticles are formed to react with one another in such manner as to produce an aliphatic or aromatic hydrocarbon or carbon precursor coating, photoluminescence, biocompatibility, or catalysis. In further examples, the step of processing the silicon in the presence of the processing liquid functionalizes the silicon material as the nanoparticles are formed to react with an aerogel precursor. In an example, the processing liquid can include a polyimide precursor monomer. The processing liquid can comprise isopropanol, ethylene glycol methyl ether methacrylate, polyethylene glycol methyl ether methacrylate, unsaturated glycol, hydroxide groups, allylamine, vinyl benzyl amine hydrochloride, aminoethyl methacrylate hydrochloride, or combinations thereof. In an example, the processing liquid comprises a hydroxyl, an unsaturated amine, an unsaturated glycol, or combinations thereof.

In exemplary embodiments, the step of processing the silicon includes grinding the silicon. In such embodiments, the processing liquid can be referred to as a grinding liquid. For example, the processing, e.g., grinding, is conducted in a ball, turbine, or jet mill. In some embodiments, processing is conducted as a batch process. In certain embodiments, the processing is conducted as a semi-batch process. In some embodiments, the processing is conducted as a continuous process.

A further aspect provides silicon nanoparticles produced by the methods disclosed herein. Another aspect provides a silicon nanoparticle composition including silicon nanoparticles and a polar solvent compatible with a process for manufacturing aerogel materials. In exemplary embodiments, the silicon nanoparticles can have a surface functionalized by interaction with the processing liquid, e.g., a polar solvent compatible with a process for manufacturing aerogel materials.

BRIEF DESCRIPTION OF THE DRAWINGS

For a full and clear understanding of the invention, reference should be made to the following detailed description, taken in connection with the accompanying drawings, in which.

DETAILED DESCRIPTION

Figure 1:
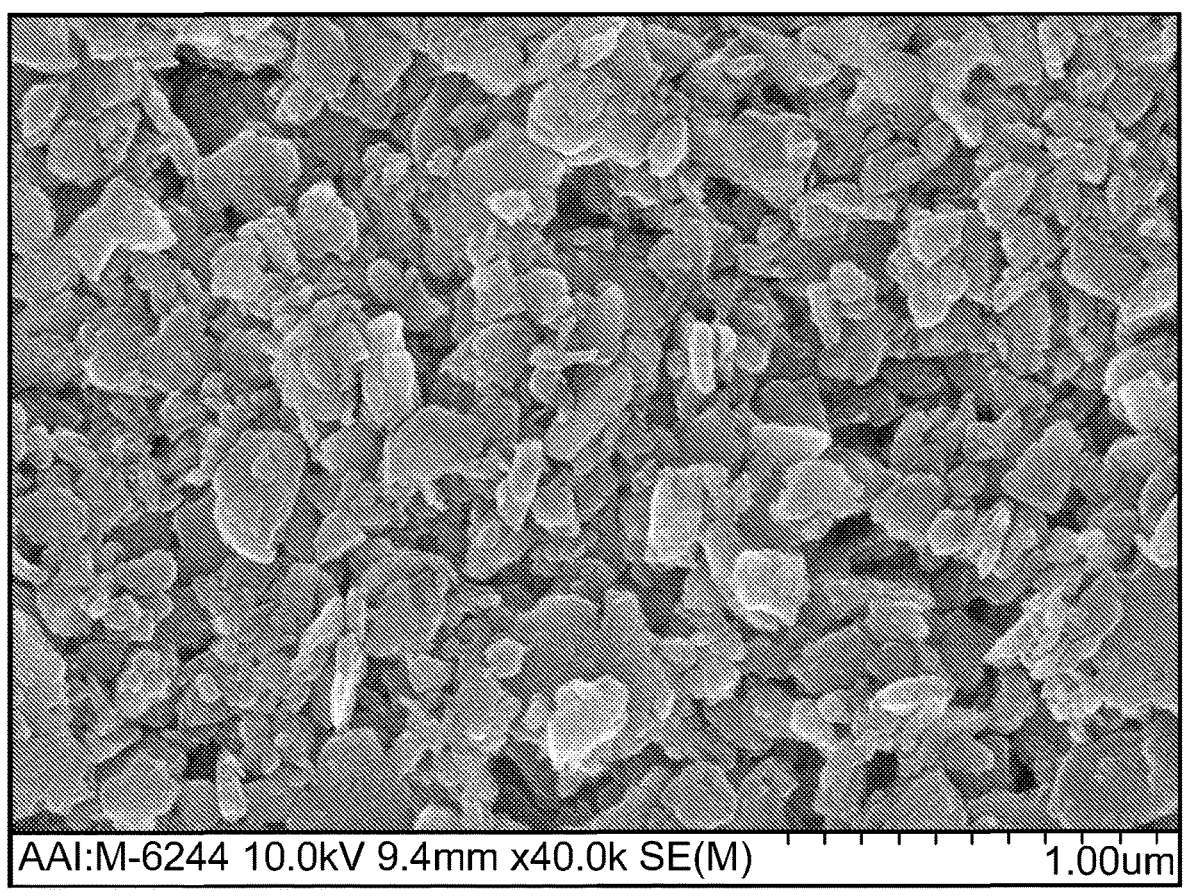
FIG. 1 is a scanning electron micrograph (SEM) of ground nanoparticle silicon according to embodiments disclosed herein.

In the following detailed description of the invention, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

As used herein, "about" means approximately or nearly and in the context of a numerical value or range set forth means±15% of the numerical. In an embodiment, the term "about" can include traditional rounding according to significant figures of the numerical value. In addition, the phrase "about 'x' to 'y'" includes "about 'x' to about 'y'".

In exemplary embodiments, the systems and methods disclosed herein provide a low-cost method of processing, e.g., processing to deagglomerate or processing to reduce particle size, electroactive materials, e.g., metals, metal oxides, and metalloids, into sub-micron particles, which are suitable for incorporation with a highly efficient carbon material for lithium-ion batteries (LIBs). In some embodiments, the processing methods include grinding the electroactive materials. In certain embodiments, the electroactive materials can include metals, metal oxides, metalloids, in particular silicon (Si), other metals such as Ti, Zr, V, Nb, Cr, Mo, Mn, Fe, Ru, Co, Rh, Ni, Pd, Pt, Cu, Cd, Se, Ag, Zn, Sn, Pb, Sb, Nb, Bi, Hf, Ba, Al, B, P, As, $Al_2O_3$, and any combinations thereof. For example, silicon particles provided by the disclosed methods are useful in the production of a silicon-doped, carbon material, where the silicon particles are contained at least partially within the carbon material.

Powders can be produced by various techniques, including electrochemical reduction and mechanical milling, i.e., grinding. Grinding can be conducted using wet or dry processes. In dry grinding processes, powder is added to a vessel, together with grinding media. The grinding media typically includes balls or rods of zirconium oxide (yttrium stabilized), silicon carbide, silicon oxide, quartz, or stainless steel. The particle size distribution of the resulting ground material is controlled by the energy applied to the system and by matching the starting material particle size to the grinding media size. However, dry grinding is an inefficient and energy consuming process. Wet grinding is similar to dry grinding with the addition of a grinding liquid. An advantage of wet grinding is that the energy consumption for producing the same result is 15-50% lower than for dry grinding. A further advantage of wet grinding is that the grinding liquid can protect the grinding material from oxidizing. It has also been found that wet grinding can produce finer particles and result in less particle agglomeration.

Wet grinding can be performed using a wide variety of liquid components. Grinding in this disclosure is not limited to changing particle sizes by fractionalization, grinding can include deagglomeration of particles. In an exemplary embodiment, the grinding liquid or components included in the grinding liquid are selected to reduce or eliminate chemical functionalization on the surface of the silicon particles during or after grinding. In other embodiments, the grinding liquid or components included in the grinding liquid are selected to provide a desired surface chemical functionalization of the particles, e.g., the silicon particles, during or after grinding. The grinding liquid or components included in the grinding liquid can also be selected to control the chemical reactivity or crystalline morphology of the particles, e.g., the silicon particles. In exemplary embodiments, the grinding liquid or components included in the grinding liquid can be selected based on compatibility or reactivity with downstream materials, processing steps or uses for the particles, e.g., the silicon particles. For example, the grinding liquid or components included in the grinding liquid can be compatible with, useful in, or identical to the liquid or solvent used in a process for forming or manufacturing organic or inorganic aerogel materials. In yet another embodiment, the grinding liquid or components included in the grinding liquid produce a coating on the silicon particle surface or an intermediary species, such as an aliphatic or aromatic hydrocarbon, or by cross-linking or producing cross-functional compounds, that react with the organic or inorganic aerogel material.

Aerogels and xerogels can be formed of inorganic materials and/or organic materials. When formed of organic materials—such as phenols, resorcinol-formaldehyde (RF), phloroglucinol furfuraldehyde (PF), polyacrylonitrile (PAN), polyimide (PI), polyurethane (PU), polybutadiene, polydicyclopentadiene, and precursors or monomeric, oligomeric, or polymeric derivatives thereof, for example—the aerogel or xerogel may be carbonized (e.g., by pyrolysis) to form a carbon aerogel, which can have properties (e.g., pore volume, pore size distribution, morphology, etc.) that differ or overlap from each other, depending on the precursor materials and methodologies used. Polyimide precursors, such as diamine and dianhydride that can each include an aromatic group and/or an aliphatic group, are mixed in a suitable solvent, e.g., polar, aprotic solvent. Polyimides are traditionally synthesized by formation of a polyamic acid pre-polymer which can undergo ring closure via chemical, thermal, or electromagnetic radiation (e.g. photoinitiator induced imidization to obtain polyimide. The imidization reaction is typically carried out in N-methyl-2-pyrrolidone (NMP), N,N-dimethylacetamide (DMAC), or N,N-dimethylformamide (DMF), or a combination of tetrahydrofuran (THF) and methanol (MeOH) or water.

Prior to imidization, additive particles, e.g., electroactive materials such as silicon particles, are mixed into the imide precursors in solvent. During imidization, a gel is formed in which the additive particles, e.g., the silicon particles, are uniformly dispersed. The resulting mixture is then cast as a coating, three-dimensional monolithic structure, or dispersed into micron-size particles, e.g., by introducing the catalyzed precursor into a non-solvent mixed with a high-shear mixer. The polyimide containing silicon is then dried to yield a porous polyimide silicon composite, where the drying may be performed using air, heated air, or subcritical and/or supercritical carbon dioxide. The polyimide additive composite, e.g., polyimide silicon composite is then pyrolyzed to yield the continuous porous carbon composite, where the resulting composite comprises greater than 0% and less than about 95% additive, e.g., silicon, by weight and comprises a porosity between about 5%-99%. In certain embodiments, pyrolysis may be performed at a maximum temperature of between about 750° C. and about 1600° C., optionally with graphitization from about 1000° C. up to about 3000° C. Additional detail regarding polyimide compositions and processes can be found in U.S. patent application Ser. No. 16/803,348; U.S. patent application Ser. No. 63/070,230, filed Aug. 25, 2020; U.S. patent application Ser. No. 63/124,451, filed Dec. 11, 2020; and U.S. patent application Ser. No. 63/124,454, filed Dec. 11, 2020, each of which is incorporated herein by reference in its entirety.

In certain embodiments of the disclosed methods, materials are processed, e.g., by milling or grinding to reduce agglomerization, the particle size, and/or particle size distribution of the resulting particles or powder, using a grinding liquid including a solvent that is identical to or compatible with the solvent(s) used in the aerogel synthesis process. The materials include metals, metalloids, in particular silicon, other metals or metal oxides such as Ti, Zr, V, Nb, Cr, Mo, Mn, Fe, Ru, Co, Rh, Ni, Pd, Pt, Cu, Ag, Zn, Sn, Pb, Sb, Nb, Bi, Hf, Ba, Al, B, P, As, $Al_2O_3$, and combinations thereof. For example, the grinding liquid can include an appropriate polar aprotic solvent such as DMSO, DMF, NMP, DMAC, THF, 1,4-dioxane, diglyme, acetonitrile, isopropanol, water, or any combination thereof. In certain embodiments, the grinding liquid can include DMAC or consist essentially of DMAC. In some embodiments, the grinding liquid can include water, consist essentially of water, or a combination of water and any of the aforementioned materials.

By using the same or a compatible solvent for the grinding liquid, as the solvent(s) used to prepare the aerogel precursor materials, an intermediary drying step (or other processing step, e.g., fractional distillation) to remove the grinding solvent can be eliminated. Drying of ground additive particles can also result in agglomeration of the particles. The agglomerations of particles must typically be de-agglomerated, e.g., by high shear mixing, centrifuge, sieve, etc., before the additive particles can be further processed. By grinding with a liquid that is the same or compatible with the solvent used for the formation of the aerogel precursor, both the drying and de-agglomeration step can be eliminated. Furthermore, the grinding liquid can be chosen to produce a chemical functionalization of the particle surface such that the nanoparticles will react, bond, or adsorb to the aerogel material or other nanoparticles, and improve the LIB's size, mass, volume, or charge/discharge capacity.

Figure 2:
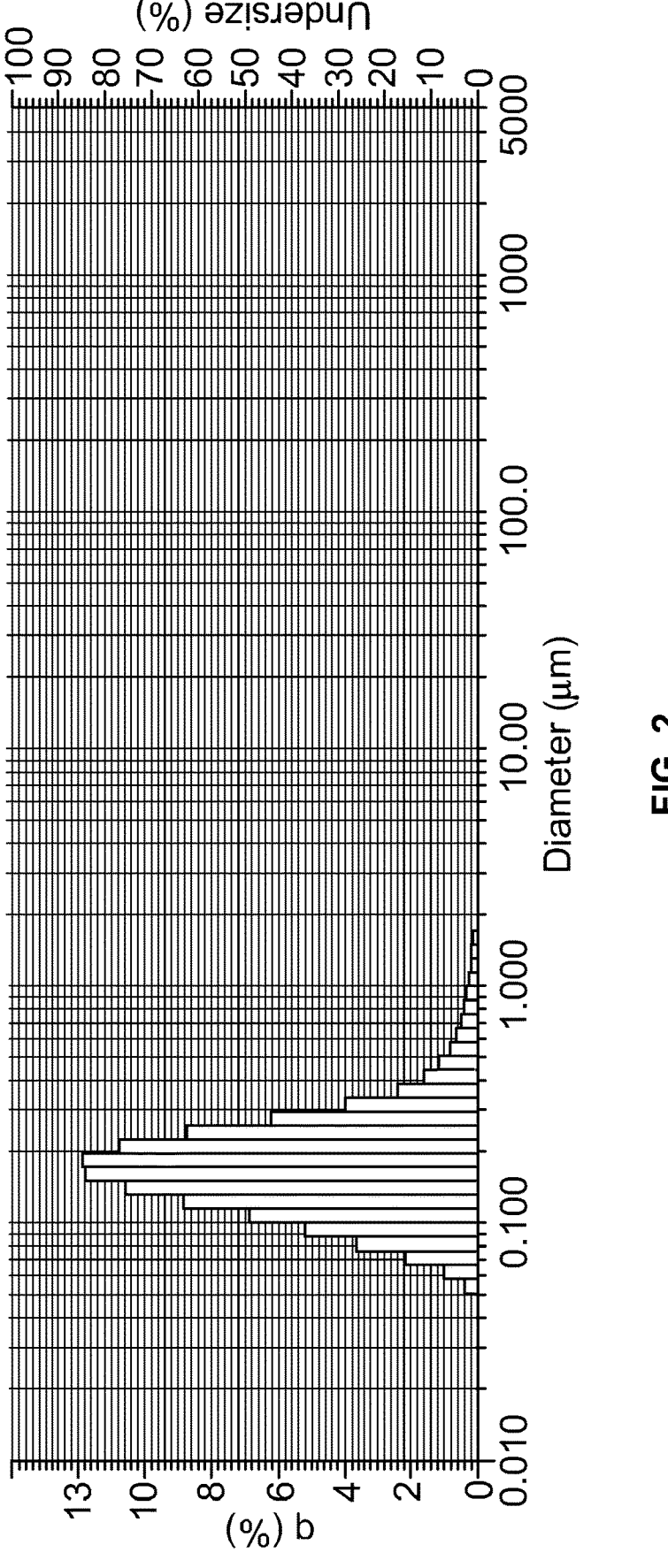
FIG. 2 is a chart of silicon particle size distribution according to embodiments disclosed herein measured using laser diffraction.

After processing according to embodiments disclosed herein, e.g., by grinding, the particles, e.g., particles of electroactive materials such as silicon particles, can have a maximum dimension in the range of about 1 nm to about 150 nm. Particles of the present disclosure can be fine particles, e.g., micron-sized particles with a maximum dimension, e.g., a diameter for a substantially spherical particle, in the range of about 150 nm to about 10 micrometers or larger. For example, particles of the present disclosure can have a maximum dimension, e.g., a diameter for a substantially spherical particle, of about 10 nm, 50 nm, 100 nm, 150 nm, 200 nm, 500 nm, 1 micrometer, 1.5 micrometers, 2 micrometers, 3 micrometers, 5 micrometers, 10 micrometers, 20 micrometers, 40 micrometers, 50 micrometers, 100 micrometers, or in a range between any two of these values. In some embodiments, the particles are flat fragmented shapes, e.g., platelets, having two dimensions, e.g., a length and a width, of about 10 nm, 50 nm, 100 nm, 150 nm, 200 nm, 500 nm, 1 micrometer, 1.5 micrometers, 2 micrometers, 3 micrometers, 5 micrometers, 10 micrometers, 20 micrometers, 40 micrometers, 50 micrometers, 100 micrometers, or in a range between any two of these values. FIG. 2 is a chart of silicon particle size according to embodiments disclosed herein measured using laser diffraction. Particle size can be measured using a laser diffraction/scattering particle size distribution analyzer (LA-960 Laser Diffraction Analyzer made by HORIBA, Ltd.). The silicon nanoparticles can have a particle size distribution of $D_{50}$ of less than 500 μm, less than 400 μm, or less than 300 μm.

In some embodiments, the particles can be monodispersed or substantially monodispersed. In other embodiments, the particles can have a particle size distribution. Within the context of the present disclosure, the dimensions of silicon particles are provided based upon the median of the particle size distribution, i.e., the $D_{50}$. The particles, e.g., particles of electroactive materials such as silicon particles, can have various shapes after processing according to embodiments disclosed herein. In some embodiments, silicon particles ground according to the processes disclosed herein can be substantially planar flakes, i.e., having a flat fragmented shape, which can also be referred to as a platelet shape, as shown in FIG. 1. For example, the particles have two substantially flat major surfaces connected by a minor surface defining the thickness between the major surfaces. In other embodiments, particles of electroactive materials can be substantially spherical, cubic, obolid, elliptical, disk-shaped, or toroidal.

As discussed above, the solvent or mixture of solvents used for grinding can be selected to control the chemical functionalization of the particles during or after grinding. Using silicon as an example, and without being bound by theory, grinding silicon in alcohol-based solvents, such as isopropanol, can functionalize the surface of the silicon and bond alkoxide surface groups, e.g., isopropoxide onto the surface of the silicon particles by hydrogen bonds or covalent bonds. In exemplary embodiments, grinding can be carried out in polar aprotic solvents such as DMSO, DMF, NMP, DMAC, THF, 1,4-dioxane, diglyme, acetonitrile, isopropanol, water or any combination thereof, which has numerous advantages. Reactive chemicals can be used as the solvent in the grinding process. For example, the reactive chemicals can include one or more of alkene, alkyne, alcohol, carboxylic acid, and aldehyde each with functional groups including, but not limited to, —OH, —COOH, —C—O—C—, —NH₂, —NHR, and combinations thereof.

For example, grinding in a solvent compatible with a process for manufacturing aerogel materials, such as the aforementioned polar aprotic solvents, can eliminate the need to remove the grinding liquid from the particles before addition to an aerogel manufacturing process because the grinding liquid is the same as or compatible with the solvents used in the aerogel process. In other embodiments, the grinding liquid can include a monomer, oligomer, or polymer precursor. For example, the grinding liquid can include a polyimide precursor monomer, such as polyacrylic acid (PAA). For another example, the grinding liquid can include the sol-gel liquid. In these embodiments, the grinding liquid including precursor components (e.g., aerogel precursors) or sol-gel liquid can impart the sol-gel functionality to the surface of the particles, e.g., the silicon particles. In further embodiments, the grinding liquid can be selected to impart functionality to the surface of the particles, e.g., the silicon particles, such that the functionalized particles react or interact with each other during or following the grinding process.

In an example, the silicon particle (e.g., silicon nanoparticle) surface can be modified with functional groups that can aid in dispersing the silicon particles in a porous three-dimensional network. In an example, the porous three-dimensional network can be a sol-gel, aerogel, xerogel, foam structure, among others. The functional groups that are grafted onto the surface of the silicon particles can be chosen to aid in forming a uniform distribution of the silicon particles within the three-dimensional network.

Figure 3:
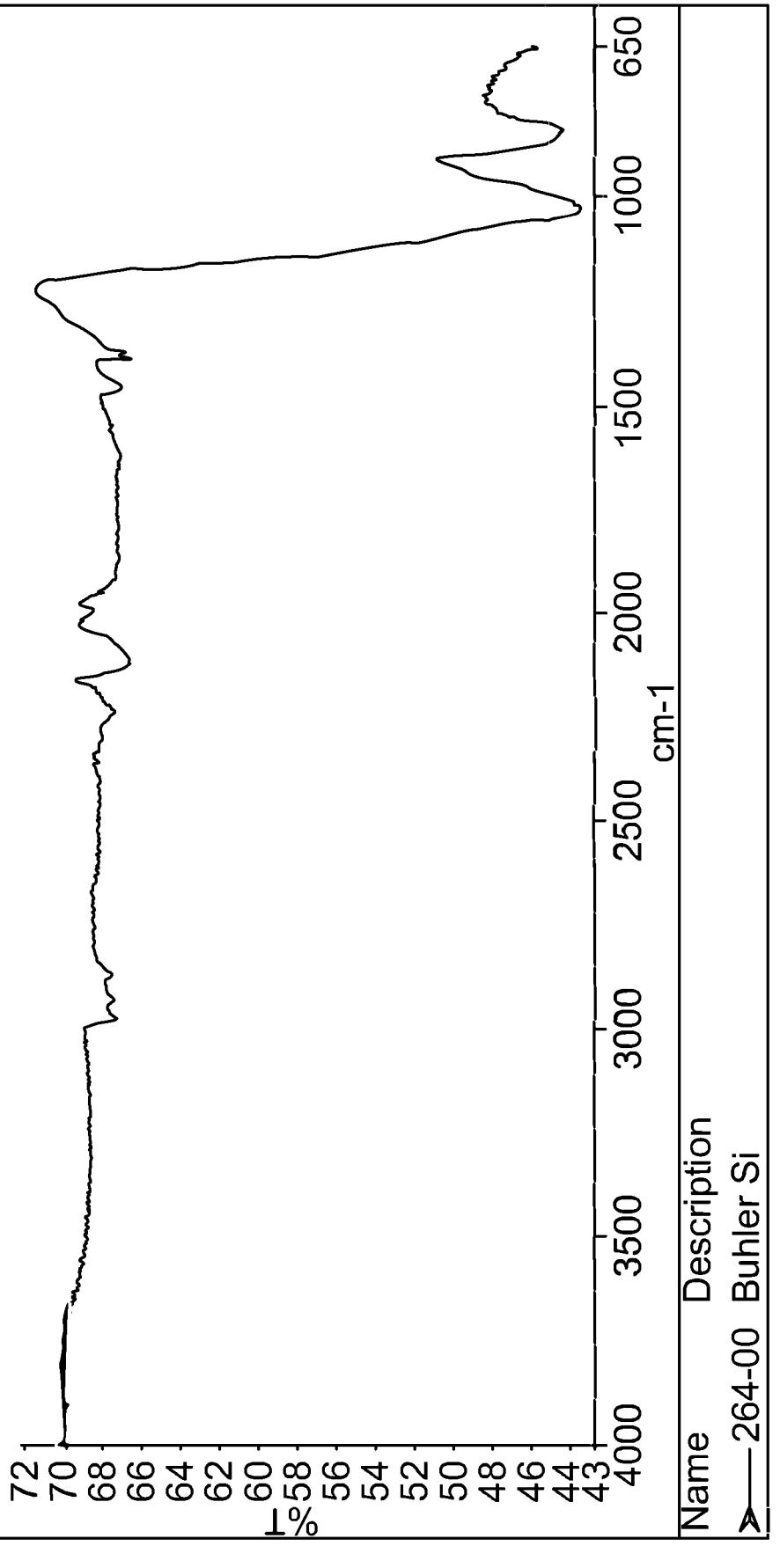
FIG. 3 is an infrared spectrum of isopropanol grated silicon.

For example, functional groups can be grafted onto the surface of the silicon particles by covalent bonds and/or hydrogen bonds. Before functionalization, the surface of the silicon particles can include silane groups, such as silicon hydride, and/or silicon oxide groups. In some embodiments, at least a portion of those silane and silicon oxide groups can be present in combination with the bonded functional groups after functionalization of the surface of the silicon particles, e.g., the silicon particle surface can include silane groups and the bonded functional groups, silicon oxide groups and the bonded functional groups, or both silane and silicon oxide groups and the bonded functional groups. The presence of the functional groups on the surface of the silicon particles can be detected by various techniques, for example, by infrared spectroscopy. Exemplary spectra of functionalized silicon particles show characteristic peaks of Si—O—C bonds in the range of 800-900 $cm^{-1}$ and characteristic peaks of C—H bonds in the range of 1370-1460 $cm^{-1}$ and 2870-2980 $cm^{-1}$. These characteristic peaks indicate successful grafting of functional groups to the surface of the silicon particles. For as specific example, FIG. 3 illustrates an infrared spectrum of silicon nanoparticles functionalized with isopropanol, as discussed in Example 1, below.

The surface of the silicon particles can functionalized with hydrophilic groups to aid in improved dispersion within the porous three-dimensional network. Without being bound by theory, the functionalization with hydroxide groups creates increased hydrogen bonding and/or covalent bonding between the surface groups on the silicon particles and the porous three-dimensional network. As a result, the functionalized silicon particles can be uniformly dispersed within the porous three-dimensional network. For example, hydrophilic hydroxide groups can be grafted to the surface of the particles by unsaturated glycol to increase the hydrophilicity of silicon particle surfaces. Increasing the hydrophilicity of the silicon nanoparticles allows for the nanoparticles to be and remain more uniformly dispersed in the three-dimensional network and remain uniformly dispersed in the three-dimensional network in any additional processing (e.g., pyrolysis). In an example, functionalization via glycol can improve the dispersion of silicon particles within a polyimide sol-gel and/or aerogel. Any suitable glycol can be used including, but not limited to, ethylene glycol methyl ether methacrylate, poly(ethylene glycol) methyl ether methacrylate, among others.

In another example, the functional groups can be reactive amino groups. For example, amino groups can be grafted to the surface of the silicon nanoparticles via an unsaturated amine. The reactive amino groups can covalently bond to the surface of the silicon particles. The reactive amino groups can bond to the surface of the silicon particles by hydrogen bonds. In an example, the reactive amino groups grafted to the silicon particle can participate in the reaction of polyimide synthesis. In such example, the grafted amino groups can be used to covalently bond the particles to the polyimide matrix. In some examples, the grafted amino groups can be used to bond the particles to the polyimide matrix by hydrogen bonds. The reactive amino groups can include, but not limited to, allylamine, vinyl benzyl amine hydrochloride, amino ethyl methacrylate hydrochloride, and combinations thereof.

The functional groups can be selected to participate in the reactions of aerogel formation. For example, the functionalization of the surface of the nanoparticles can be selected such that the functional groups can participate in reactions of polyimide synthesis.

Example 1

Silicon powder with particle size of 1-5 microns were ground in a Buhler MMX-1 Ball Mill with isopropanol as the solvent for 5 hours. The resulting silicon nanoparticles had a size of 130 nm. The silicon powder was dried at 80° C. for 24 hours to remove residual isopropanol. The infrared spectrum of the obtained silicon nanoparticles can be seen in FIG. 3. The characteristic peaks of Si—O—C bonds are seen in the range of 800-900 $cm^{-1}$ and the characteristic peaks of C—H bonds are seen in the range of 1370-1460 $cm^{-1}$ and 2870-2980 $cm^{-1}$, indicating successful grafting of isopropanol to the silicon surface. The isopropanol grafted silicon nanoparticles are more hydrophilic and able to be uniformly dispersed in water than unmodified silicon particles.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference should be disregarded.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A composition comprising:
silicon particles having a diameter of between 50 nm and 500 nm, wherein a surface of the silicon particles includes bonded functional groups;
a porous three-dimensional network comprising a carbon aerogel or a carbon xerogel, wherein the silicon particles are dispersed throughout the porous three-dimensional network; and
wherein the bonded functional groups include at least one of —OH, —COOH, —C—O—C—, —NH$_2$, —NHR, or combinations thereof.

2. The composition according to claim 1, wherein the porous three-dimensional network comprises a polyimide-derived carbon aerogel or polyimide-derived carbon xerogel.

3. The composition according to claim 1, wherein the bonded functional groups on the surface of the silicon particles are bonded to carbon atoms within the porous three-dimensional network.

4. The composition according to claim 1, wherein the bonded functional groups comprise hydroxyl, unsaturated amino, unsaturated glycol, or combinations thereof.

5. The composition according to claim 1, wherein the surface of the silicon particles includes covalently bonded functional groups.

6. The composition according to claim 1, wherein the surface of the silicon particles includes hydrogen bonded functional groups.

7. The composition according to claim 1, wherein the bonded functional groups on the surface of the silicon particles are covalently bonded to carbon atoms within the porous three-dimensional network.

8. The composition according to claim 1, wherein the bonded functional groups on the surface of the silicon particles are hydrogen bonded to carbon atoms within the porous three-dimensional network.

9. The composition according to claim 1, wherein the surface of the silicon particles includes silane groups.

10. The composition according to claim 9, wherein the silane groups comprise silicon hydride.

11. The composition according to claim 1, wherein the surface of the silicon particles includes silicon oxide groups.

12. The composition according to claim 1, wherein the silicon particles have a diameter of less than 150 nm.

13. The composition according to claim 1, further comprising a polar solvent compatible with a process for manufacturing aerogel materials or xerogel materials.

14. A composition comprising:

silicon particles having a diameter of between 50 nm and 500 nm, wherein a surface of the silicon particles includes bonded functional groups;

a porous three-dimensional network comprising a carbon aerogel or a carbon xerogel, wherein the silicon particles are dispersed throughout the porous three-dimensional network; and wherein the bonded functional groups are selected from the group consisting of isopropanol, ethylene glycol methyl ether methacrylate, polyethylene glycol methyl ether methacrylate, unsaturated glycol, hydroxide groups, allylamine, vinyl benzyl amine hydrochloride, and aminoethyl methacrylate hydrochloride.

15. The composition according of claim 14, wherein the porous three-dimensional network comprises a polyimide-derived carbon aerogel or a polyimide-derived carbon xerogel.

16. The composition according to claim 14, wherein the bonded functional groups on the surface of the silicon particles are bonded to carbon atoms within the porous three-dimensional network.

17. The composition according to claim 14, wherein the bonded functional groups comprise hydroxyl, unsaturated amino, unsaturated glycol, or combinations thereof.

18. The composition according to claim 14, wherein the surface of the silicon particles includes covalently bonded functional groups.

19. The composition according to claim 14, wherein the surface of the silicon particles includes hydrogen bonded functional groups.

20. The composition according to claim 14, wherein the functional groups on the surface of the silicon particles are covalently bonded to carbon atoms within the porous three-dimensional network.

21. The composition according to claim 14, wherein the functional groups on the surface of the silicon particles are hydrogen bonded to carbon atoms within the porous three-dimensional network.

22. The composition according to claim 14, further comprising a polar solvent compatible with a process for manufacturing aerogel materials.

* * * * *